United States Patent
Alahmady

(10) Patent No.: US 11,836,779 B2
(45) Date of Patent: Dec. 5, 2023

(54) SYSTEMS, METHODS, AND MANUFACTURES FOR UTILIZING MACHINE LEARNING MODELS TO GENERATE RECOMMENDATIONS

(71) Applicant: Verizon Patent and Licensing Inc., Arlington, VA (US)

(72) Inventor: Kaiss K. Alahmady, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1062 days.

(21) Appl. No.: 16/678,882

(22) Filed: Nov. 8, 2019

(65) Prior Publication Data

US 2021/0142385 A1   May 13, 2021

(51) Int. Cl.
  *G06Q 30/00*   (2023.01)
  *G06Q 30/0601*   (2023.01)
  *G06N 5/04*   (2023.01)
  *G06N 20/00*   (2019.01)

(52) U.S. Cl.
  CPC ........... *G06Q 30/0631* (2013.01); *G06N 5/04* (2013.01); *G06N 20/00* (2019.01)

(58) Field of Classification Search
  CPC ..... G06Q 30/0601–0645; G06Q 30/08; G06N 20/00; G06N 5/04
  USPC .............................................. 705/26.1–27.2
  See application file for complete search history.

(56) References Cited

U.S. PATENT DOCUMENTS

| | | | |
|---|---|---|---|
| 7,424,439 B1* | 9/2008 | Fayyad | G06Q 30/02 |
| | | | 705/7.33 |
| 11,138,631 B1* | 10/2021 | Perevodchikov | G06N 20/20 |
| 2018/0089737 A1* | 3/2018 | Ali | G06Q 30/0255 |
| 2020/0104395 A1* | 4/2020 | Bhatia | G06N 3/08 |
| 2020/0265449 A1* | 8/2020 | Sundararaj | G06Q 30/0276 |

OTHER PUBLICATIONS

An, Jisun et al., Customer segmentation using online platforms . . . , Aug. 2018, Institutional Knowledge at Singapore Management University, accessed at [https://ink.library.smu.edu.sg/cgi/viewcontent.cgi?article=6330&context=sis_research] (Year: 2018).*

(Continued)

*Primary Examiner* — Michael Misiaszek
*Assistant Examiner* — Lindsey B Smith

(57) ABSTRACT

A device may receive customer data associated with customers of items, and may identify customer characteristics based on the customer data. The device may process the customer characteristics, with a first model, to group the customers into groups of customers, and may process item data and data identifying the groups of customers, with a second model, to determine associations between the item data and the groups of customers. The device may receive, from a user device associated with a particular customer, particular customer data, and may identify particular customer characteristics based on the particular customer data. The device may assign the particular customer to a particular group, of the groups of customers, based on the particular customer characteristics, and may generate an item recommendation, for the particular customer, based on the item data associated with the particular group. The device may provide the item recommendation to the user device.

20 Claims, 13 Drawing Sheets

(56) References Cited

OTHER PUBLICATIONS

Rocca, Baptiste, Introduction to recommender systems, Jun. 2, 2019, towardsdatascience.com, accessed at [https://towardsdatascience.com/introduction-to-recommender-systems-6c66cf15ada] (Year: 2019).*

* cited by examiner

SYSTEMS, METHODS, AND MANUFACTURES FOR UTILIZING MACHINE LEARNING MODELS TO GENERATE RECOMMENDATIONS

BACKGROUND

Recommendation systems are used in many applications to recommend products, services, movies, articles, and/or the like to customers. For example, content providers and/or websites provide suggestions or recommend features and services to customers, such as movies, articles, restaurants, places to visit, products to buy or rent, and/or the like. The recommendation systems generate these suggestions or recommended features and services. The recommendation systems generate recommendations based on past and/or current preferences of the customers in order to improve customer experience and/or a business outcome of a recommendation provider (e.g., cross-selling products and/or services, upselling products and/or services, increasing customer loyalty, increasing advertisement revenue, and/or the like).

DETAILED DESCRIPTION OF PREFERRED EMBODIMENTS

Figure 1A:
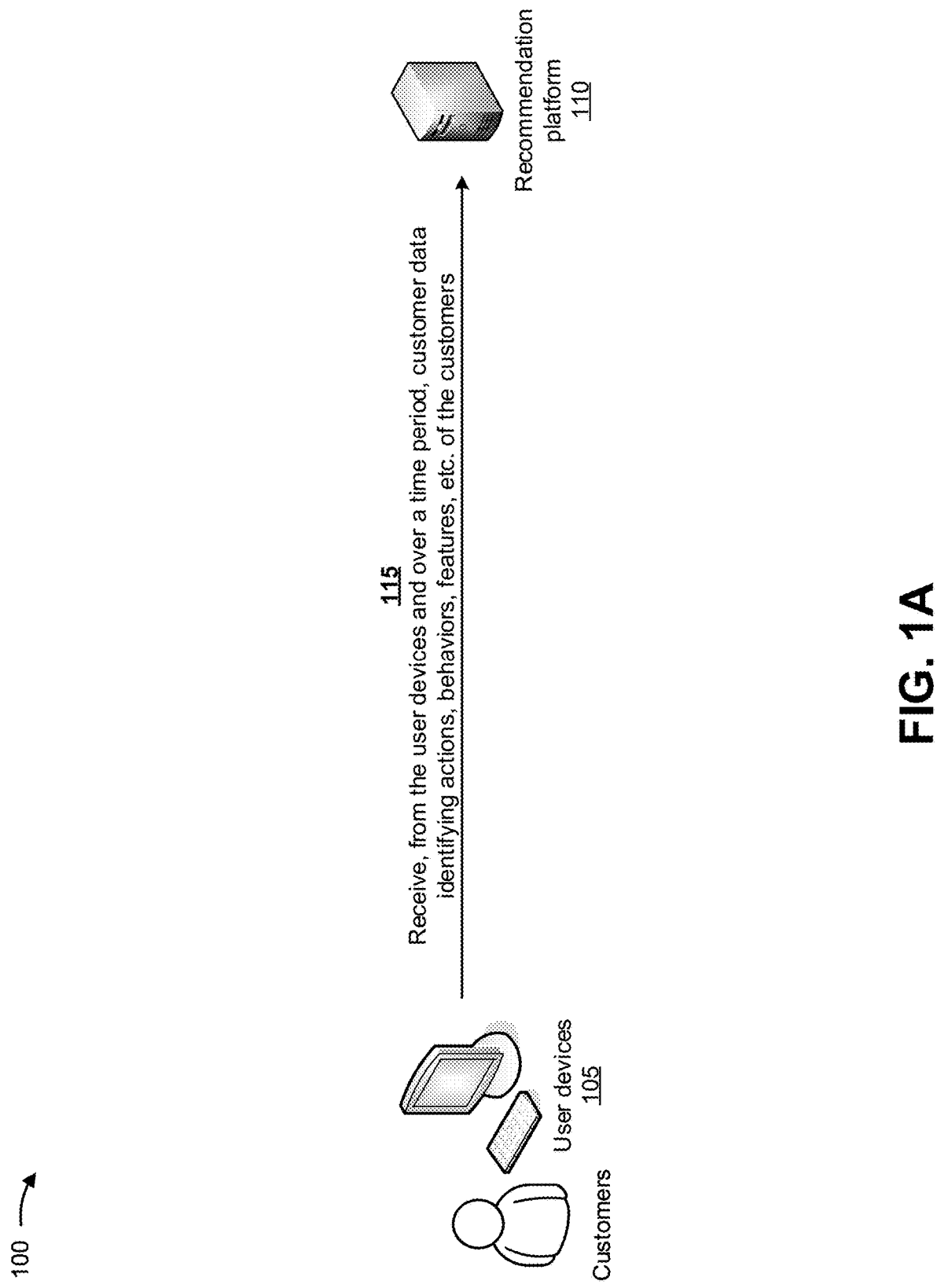
FIGS. 1A-1J are diagrams of one or more example implementations described herein.

The following detailed description of example implementations refers to the accompanying drawings. The same reference numbers in different drawings may identify the same or similar elements.

Recommendation systems are a subclass of information filtering systems that seek to predict a rating or a preference that a customer would give to a product or a service (e.g., an item). A characteristic or feature of an item is referred to as an attribute. Recommendation systems may include content-based filtering systems and collaborative filtering systems. Collaborative filtering systems are based on collecting and analyzing data identifying behaviors, activities, and/or preferences of customers. Unfortunately, collaborative filtering systems suffer from cold start issues, scalability issues, and sparsity of data issues. Content-based filtering systems are based on a description of an item and a customer profile of customer preferences, where keywords are used to describe the item and the customer profile is built to indicate types of items liked by the customer. However, content-based filtering systems are unable to learn customer preferences from actions of the customer regarding items and are unable to use the customer preferences across other items.

Thus, current recommendation systems waste computing resources (e.g., processing resources, memory resources, and/or the like), communication resources, networking resources, and/or the like associated with determining incorrect recommendations of items, implementing the incorrect recommendations, correcting the incorrect recommendations if discovered, and/or the like.

Some implementations described herein provide a recommendation platform that utilizes machine learning models to generate recommendations. For example, the recommendation platform may receive customer data identifying one or more of actions, behaviors, or features associated with customers of items, and may identify a set of customer characteristics based on the customer data. The recommendation platform may process the set of customer characteristics, with a first machine learning model, to group the customers into groups of customers, and may process item data and data identifying the groups of customers, with a second machine learning model, to determine associations between the item data and the groups of customers. The recommendation platform may receive, from a user device associated with a particular customer, particular customer data identifying one or more of actions, behaviors, or features, associated with the particular customer, and may identify particular customer characteristics for the particular customer based on the particular customer data. The recommendation platform may assign the particular customer to a particular group, of the groups of customers, based on the particular customer characteristics, and may generate an item recommendation recommending one of the items, for the particular customer, based on the particular group and the item data associated with the particular group. The recommendation platform may provide the item recommendation to the user device associated with the particular customer.

In this way, the recommendation platform utilizes machine learning models to generate recommendations. Unlike current techniques, the recommendation platform does not suffer from cold start issues, scalability issues, and sparsity of data issues, is able to learn customer preferences from actions of the customer regarding items, and is able to use the customer preferences across other items. Thus, the recommendation platform conserves computing resources, communication resources, networking resources, and/or the like that would otherwise be wasted in identifying incorrect recommendations of items, implementing the incorrect recommendations, correcting the incorrect recommendations if discovered, and/or the like.

FIGS. 1A-1J are diagrams of one or more example implementations 100 described herein. As shown in FIG. 1A, user devices 105 may be associated with customers and a recommendation platform 110. User devices 105 may include mobile devices, computers, telephones, set-top boxes, and/or the like that the customers may utilize to interact with recommendation platform 110. Recommendation platform 110 may include a platform that utilizes machine learning models to generate item recommendations for the customers. The customers may be current purchasers, renters, subscribers, and/or the like of items (e.g., products, services, and/or the like) that may be recommended by recommendation platform 110, may be previous purchasers, renters, subscribers, and/or the like of such items, and/or the like.

As further shown in FIG. 1A, and by reference number 115, recommendation platform 110 may receive, from user devices 105 and over a time period, customer data identifying actions, behaviors, features, and/or the like, of the customers. The actions of the customers may include actions associated with access, contemplation, sampling, acquisition, consumption, and/or the like of items (e.g., products and/or services) by the customers. The behaviors of the customers may include activities associated with purchases, use, disposal, and/or the like of items (e.g., products and/or services), including emotional, mental, behavioral, and/or the like responses of the customers that precede or follow these activities. The features of the customers may include demographic features of the customers, such as races, ethnicities, genders, ages, education levels, professions, occupations, income levels, marital statuses, and/or the like of the customers.

For example, if recommendation platform 110 recommends video-on-demand (VOD) titles to the customers, the actions, behaviors, and/or features of the customers may include time spent by the customers consuming VOD products; time spent by the customers on particular VOD titles or genres, quantities of views of particular VOD titles or genres by the customers, whether a VOD title was viewed in its entirety or partially viewed by the customers; whether a VOD title was contemplated (e.g., by reading a description or watching a trailer) by the customers; browsing behaviors and/or habits of the customers, browsing preferences of the customers; demographics of the customers; and/or the like.

In some implementations, recommendation platform 110 may receive the customer data directly from user devices 105 (e.g., at or near a time that users of user devices 105 make purchases). Additionally, or alternatively, recommendation platform 110 may receive the customer data from another system that received the customer data directly from user devices 105, that extracted, compiled, generated, and/or the like the customer data based on data received from user devices 105, and/or the like. In some implementations, recommendation platform 110 may periodically receive the customer data, may continuously receive the customer data, may receive the customer data based on a request, and/or the like. In some implementations, recommendation platform 110 may store the customer data in a data structure (e.g., a database, a table, a list, and/or the like) associated with the recommendation platform 110.

In some implementations, recommendation platform 110 may receive the customer data over a predetermined time period (e.g., in minutes, hours, days, and/or the like). The predetermined time period may include a current time period, a most recent time period, a historical time period, and/or the like. The predetermined time period may be fixed or variable, may be customized (e.g., based on particular needs of an entity associated with the items), and/or the like. In some implementations, data points associated with the customer data may be associated with time stamps, and recommendation platform 110 may determine that the data points are associated with the predetermined time period based on the time stamps.

Figure 1B:
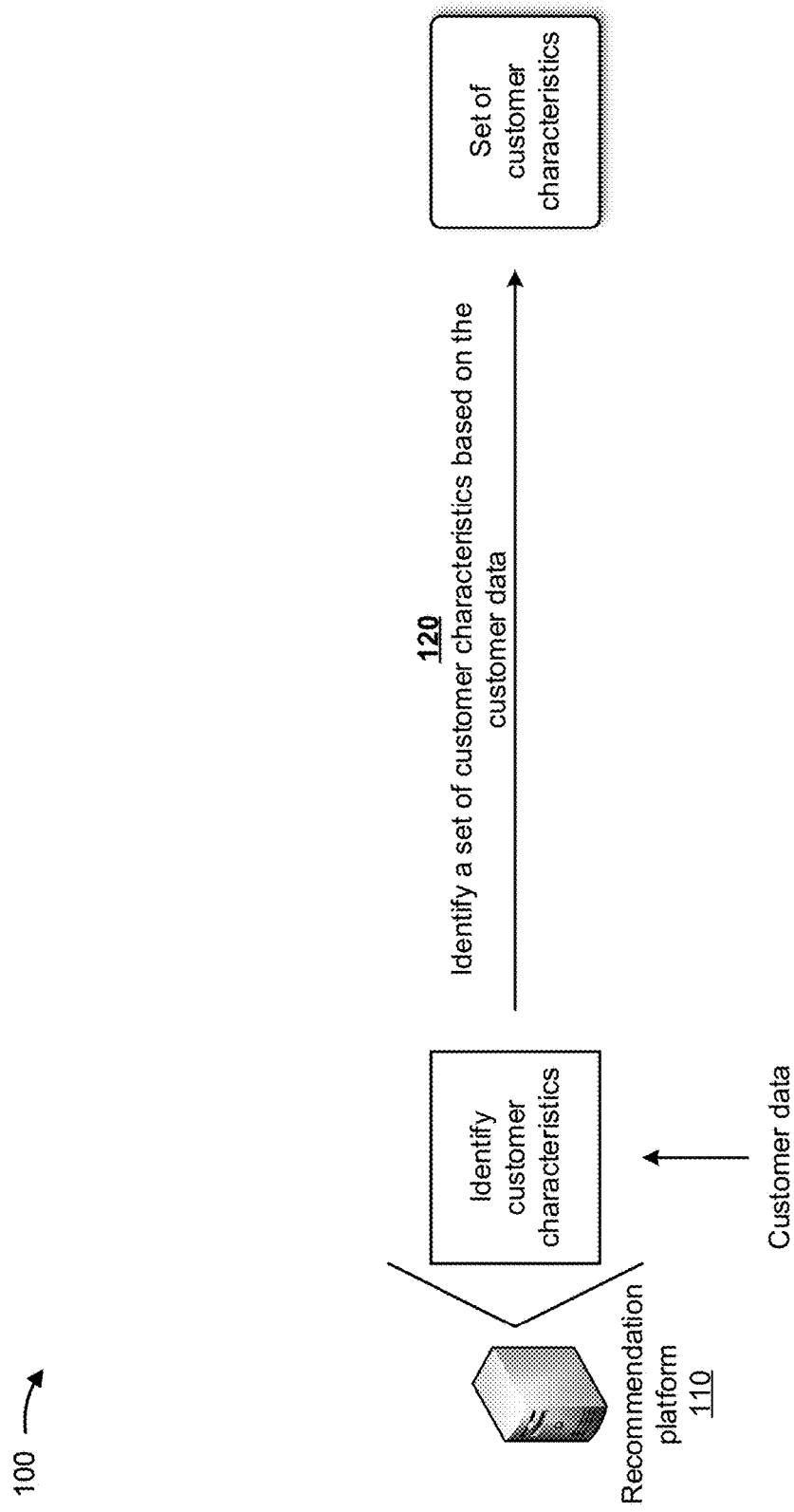

As shown in FIG. 1B, and by reference number 120, recommendation platform 110 may identify a set of customer characteristics based on the customer data. In some implementations, the set of customer characteristics may include two or more data points of the customer data. When identifying the set of customer characteristics, recommendation platform 110 may exclude, from the set of customer characteristics, data identifying features, characteristics, and properties of the items from which an item recommendation is to be generated. For example, if recommendation platform 110 is to recommend VOD titles, the set of customer characteristics may exclude data identifying properties of VOD titles themselves (e.g., data identifying a length of running time of the VOD title, which is a property of the VOD title). However, a collective watching time that a customer spends on the VOD title or a quantity of views of the VOD title are actions of the customer (e.g., and not properties of the VOD title), and therefore, data identifying the collective watching time of the VOD title and the quantity of views of the VOD title can be included in the set of the customer characteristics.

Figure 1C:
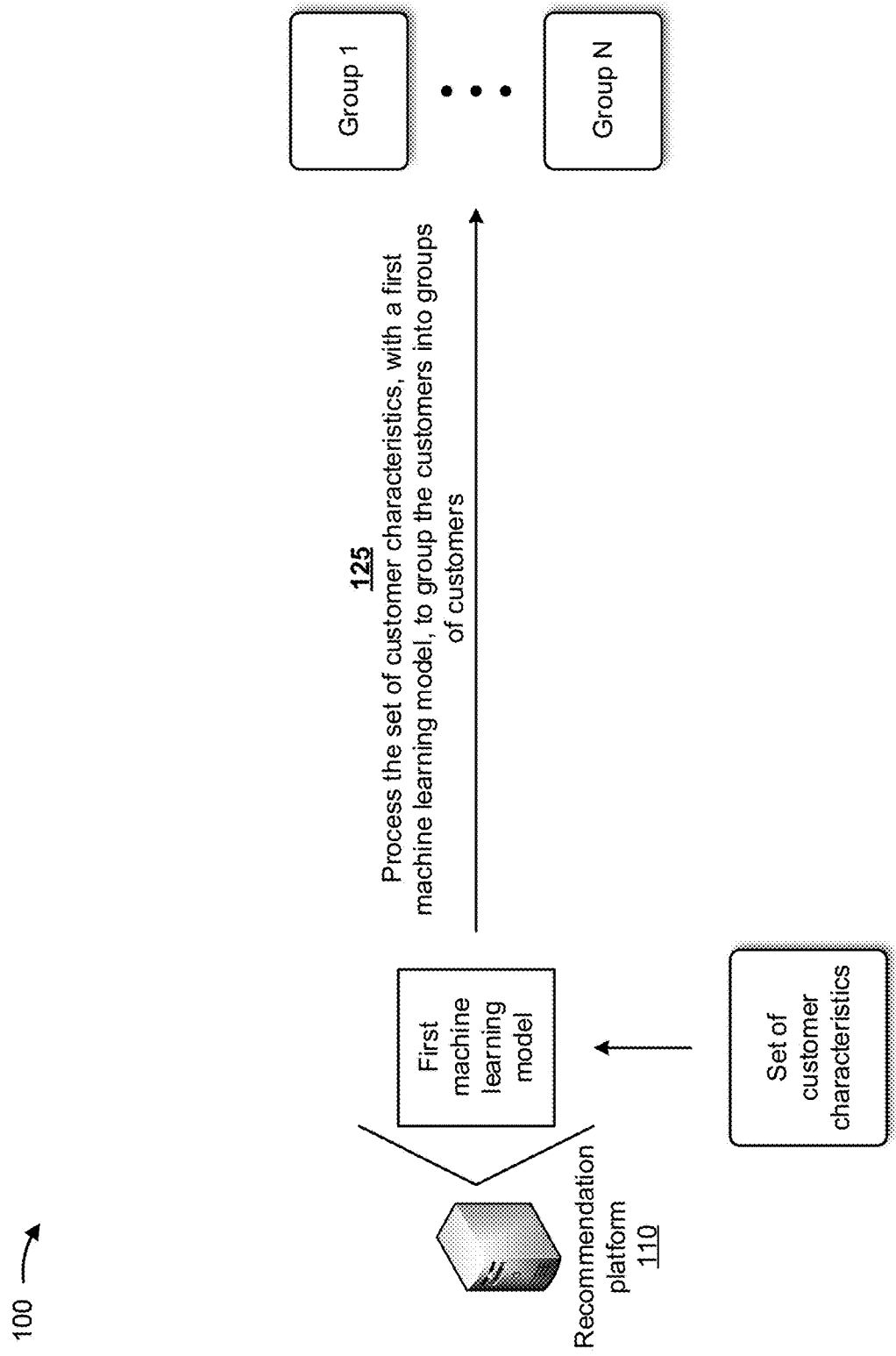

As shown in FIG. 1C, and by reference number 125, recommendation platform 110 may process the set of customer characteristics, with a first machine learning model, to group the customers into groups (e.g., Group 1 through Group N) of customers. In some implementations, the first machine learning model may include one or more statistical models, predictive models, machine learning models (e.g., segmentation models, supervised and unsupervised clustering models, reinforcement models, and/or the like), and/or the like that group the customers into groups of customers based on the set of customer characteristics.

In some implementations, when processing the set of customer characteristics with the first machine learning model, recommendation platform 110 may determine first characteristics associated with members (e.g., customers) of a group, of the groups of customers, and may determine second characteristics associated with members (e.g., customers) of remaining groups, of the groups of customers. The first characteristics may be distinguished from the second characteristics based on a quantitative criteria threshold. In some implementations, recommendation platform 110 may group the customers based on conditions (e.g., objectives, rules, and/or the like). For example, a condition may require that members of any one group generated must differ as much as possible from members of the other groups. Another condition may require that a difference be established via quantitative and/or qualitative measures of difference, which maximizes differences among the groups based on dimensions of data points and/or additional data points derived from the set of the data points (e.g., the set of customer characteristics).

In some implementations, recommendation platform 110 may group each of the customers into a single group. For example, recommendation platform 110 may allocate customers into the groups in a mutually exclusive manner, such that no customer can exist in more than one group. Alternatively, recommendation platform 110 may group customers into the groups in a manner that allows a customer to exist in more than a single group. For example, recommendation platform 110 may group each of the customers into two or more groups, and may allocate a weight for each of the two or more groups to each of the customers grouped into the two or more groups. In such an example, each customer may be allocated a series of weights, corresponding to a series of the two or more groups into which the customer is grouped, and a magnitude of each weight in the series may represent a degree of closeness of the customer to characteristics of the corresponding group. In some implementations, the sum of the weights in a series may equal one. For example, if a customer is allocated to three groups (X, Y, Z), a series of 0.7, 0.2, and 0.1 weights may indicate that customer characteristics are 70%, 20%, and 10% similar to characteristics of groups X, Y, and Z, respectively.

In some implementations, recommendation platform 110 may train the first machine learning model (e.g., with historical customer characteristics) to group customers into groups. For example, recommendation platform 110 may separate the historical customer characteristics into a training set, a validation set, a test set, and/or the like. The training set may be utilized to train the first machine learning model. The validation set may be utilized to validate results of the trained first machine learning model. The test set may be utilized to test operation of the first machine learning model.

In some implementations, recommendation platform 110 may train the first machine learning model using, for example, an unsupervised training procedure and based on the historical customer characteristics. For example, recommendation platform 110 may perform dimensionality reduction to reduce the historical customer characteristics to a minimum feature set, thereby reducing resources (e.g., processing resources, memory resources, and/or the like) to train the first machine learning model, and may apply a classification technique to the minimum feature set.

In some implementations, recommendation platform 110 may use a logistic regression classification technique to determine a categorical outcome (e.g., that particular historical customer characteristics indicate a particular group and/or weight for a customer). Additionally, or alternatively, recommendation platform 110 may use a naïve Bayesian classifier technique. In this case, recommendation platform 110 may perform binary recursive partitioning to split the historical customer characteristics into partitions and/or branches and use the partitions and/or branches to determine outcomes (e.g., that particular historical customer characteristics indicate a particular group and/or weight for a customer). Based on using recursive partitioning, recommendation platform 110 may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, recommendation platform 110 may use a support vector machine (SVM) classifier technique to generate a non-linear boundary between data points in the training set. In this case, the non-linear boundary is used to classify test data into a particular class.

Additionally, or alternatively, recommendation platform 110 may train the first machine learning model using a supervised training procedure that includes receiving input to the first machine learning model from a subject matter expert, which may reduce an amount of time, an amount of processing resources, and/or the like to train the first machine learning model relative to an unsupervised training procedure. In some implementations, recommendation platform 110 may use one or more other model training techniques, such as a neural network technique, a latent semantic indexing technique, and/or the like. For example, recommendation platform 110 may perform an artificial neural network processing technique (e.g., using a two-layer feed-forward neural network architecture, a three-layer feedforward neural network architecture, and/or the like) to perform pattern recognition with regard to patterns of the historical customer characteristics. In this case, using the artificial neural network processing technique may improve an accuracy of the trained first machine learning model generated by recommendation platform 110 by being more robust to noisy, imprecise, or incomplete data, and by enabling recommendation platform 110 to detect patterns and/or trends undetectable to human analysts or systems using less complex techniques.

In some implementations, rather than training the first machine learning model, recommendation platform 110 may receive a trained first machine learning model from another device (e.g., a server device). For example, a server device may generate the first machine learning model based on having trained first machine learning model in a manner similar to that described above, and may provide the trained first machine learning model to recommendation platform 110 (e.g., may pre-load recommendation platform 110 with the first machine learning model, may receive a request from recommendation platform 110 for the trained first machine learning model, and/or the like).

Figure 1D:
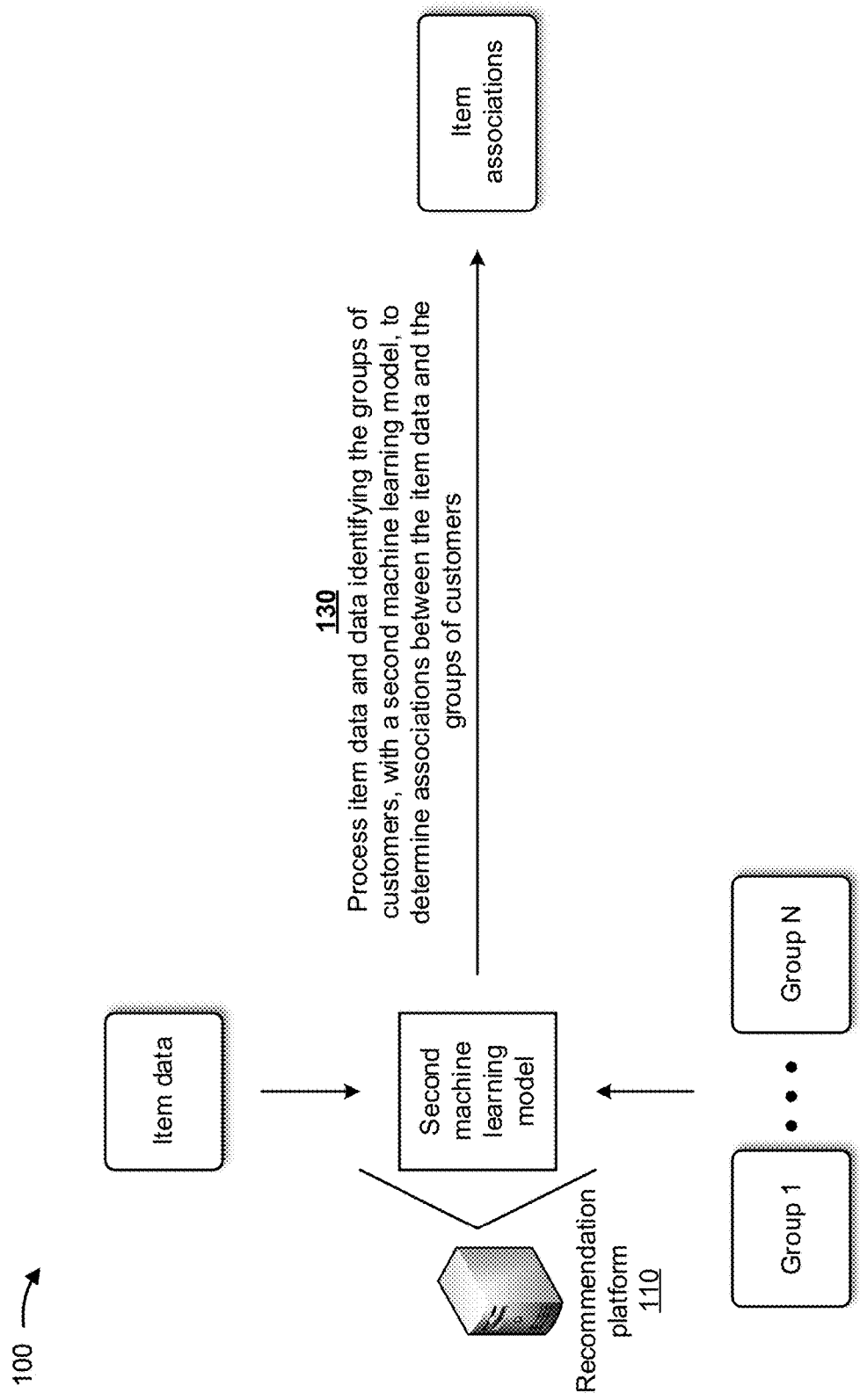

As shown in FIG. 1D, and by reference number 130, recommendation platform 110 may process item data and data identifying the groups of customers (e.g., Group 1 through Group N), with a second machine learning model, to determine associations (e.g., item associations) between the item data and the groups of customers. The item data may include data identifying items (e.g., products, services, and/or the like) offered by an entity to the customers. In some implementations, the second machine learning model may include one or more mathematical models, statistical models, machine learning models, and/or the like that determine the item associations.

In some implementations, recommendation platform 110 may determine the item associations between the item data and the groups of customers based on one or more consumption occurrence measures. A consumption occurrence measure may include a probability of a first item being consumed when a second item has been consumed. In some implementations, recommendation platform 110 may determine the consumption occurrence measures in a time series over a period of time (e.g., that is independent of the predetermined time period described above in connection with FIG. 1A). The period of time may be of any length, and may be selected based on business needs of an entity. For example, if an item involves frequent offerings and/or seasonality-driven offerings, the period of time may be selected to enable capture of such variations.

In some implementations, recommendation platform 110 may calculate the consumption occurrence measures for the items based on the item data, may calculate depth properties associated with the consumption occurrence measures, and may determine associations between the item data and the groups of customers based on the consumption occurrence measures and the depth properties. In some implementations, a depth property associated with a consumption occurrence measure may include a probability of an item being consumed when one, two, or more other items have already been consumed in a time series.

In some implementations, recommendation platform 110 may train the second machine learning model to determine the associations between the item data and the groups of customers, as described above. For example, recommendation platform 110 may train the second machine learning model in a manner similar to the first machine learning model described above in connection with FIG. 1C. In some implementations, rather than training the second machine learning model, recommendation platform 110 may obtain the second machine learning model from another system or device that trained the second machine learning model. In this case, recommendation platform 110 may provide the other system or device with historical item data for use in training the second machine learning model, and may provide the other system or device with updated historical item data to retrain the second machine learning model in order to update the second machine learning model.

Figure 1E:
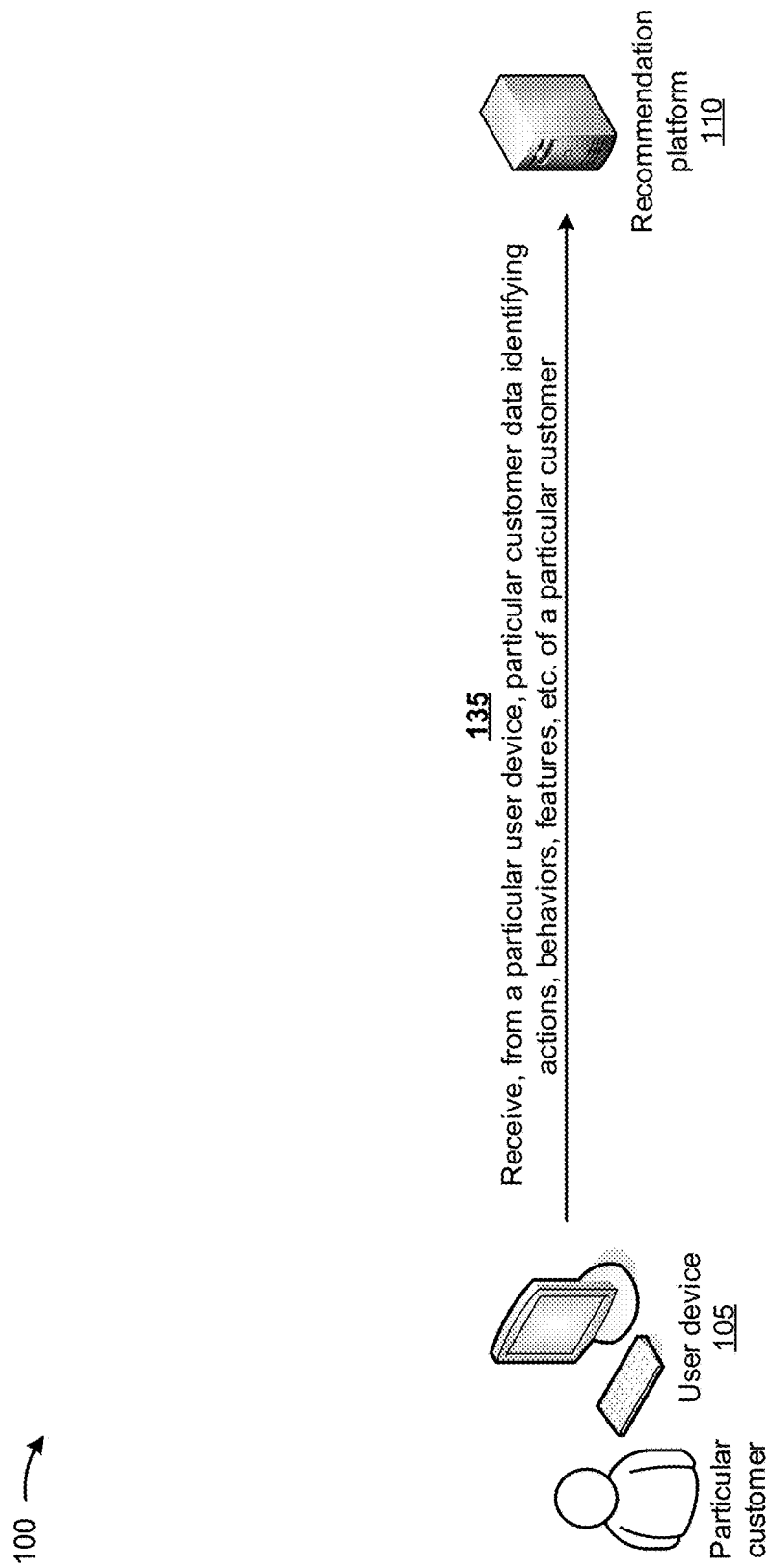

As shown in FIG. 1E, and by reference number 135, recommendation platform 110 may receive, from a particular user device 105, particular customer data identifying actions, behaviors, features, and/or the like, of a particular customer. The particular customer data may include data similar to the customer data described above in connection with FIG. 1A, but related to the particular customer. In some implementations, recommendation platform 110 may receive the particular customer data directly from particular user device 105 (e.g., at or near a time that the particular customer makes or contemplates a purchase). Additionally, or alternatively, recommendation platform 110 may receive the particular customer data from another system that received the particular customer data directly from particular user device 105; that extracted, compiled, generated, and/or the like the particular customer data based on data received from particular user device 105; and/or the like. In some implementations, recommendation platform 110 may receive the particular customer data based on the particular customer contemplating a purchase, may periodically receive the particular customer data, may continuously receive the particular customer data, may receive the particular customer data based on a request, and/or the like. In some implementations, recommendation platform 110 may store the customer data in a data structure (e.g., a database, a table, a list, and/or the like) associated with the recommendation platform 110.

Figure 1F:
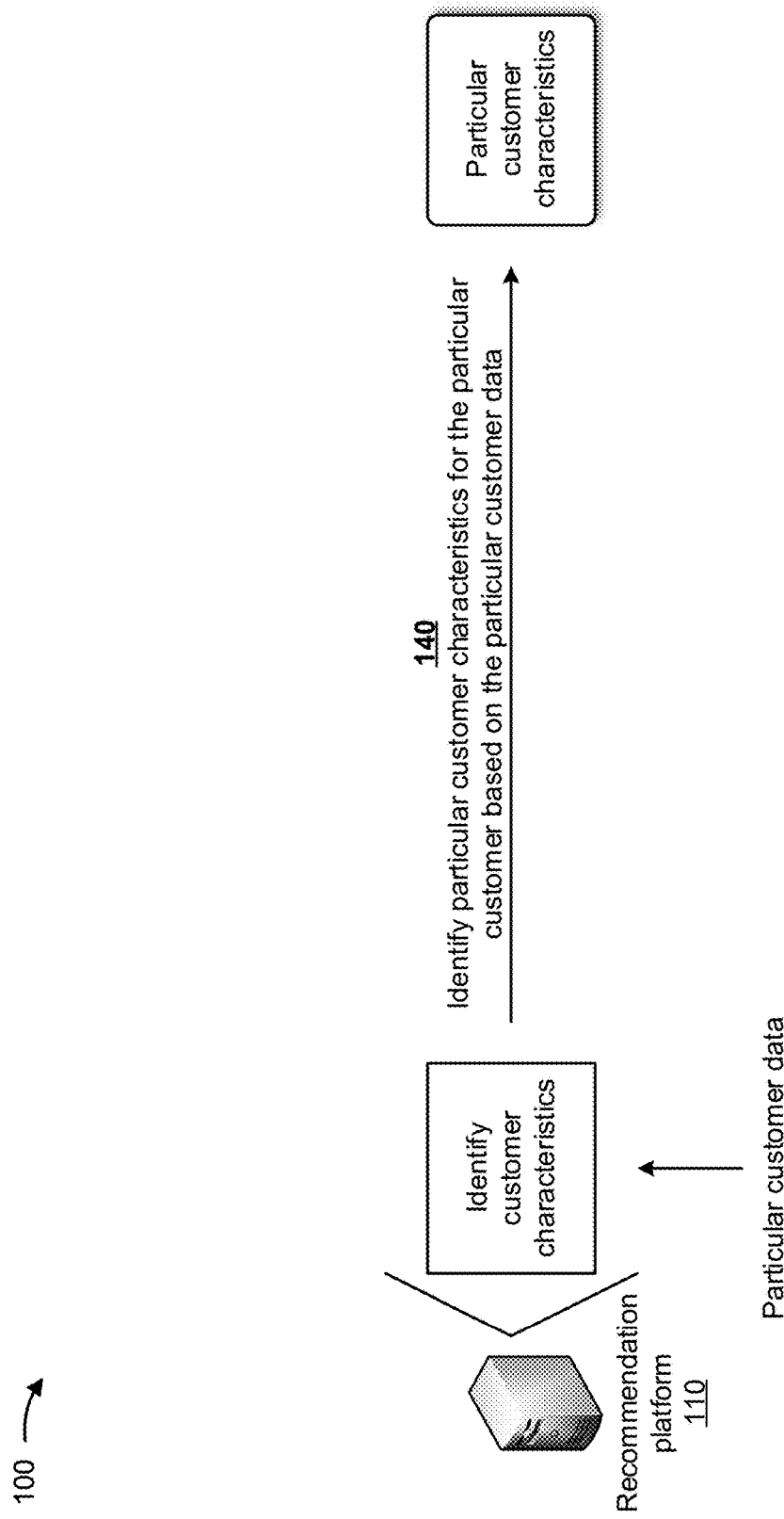

As shown in FIG. 1F, and by reference number 140, recommendation platform 110 may identify particular customer characteristics for the particular customer based on the particular customer data. In some implementations, recommendation platform 110 may identify the particular customer characteristics for the particular customer in a manner similar to the manner in which recommendation platform 110 identified the set of customer characteristics, as described above in connection with FIG. 1B. For example, the particular customer characteristics may include two or more data points of the particular customer data.

Figure 1G:
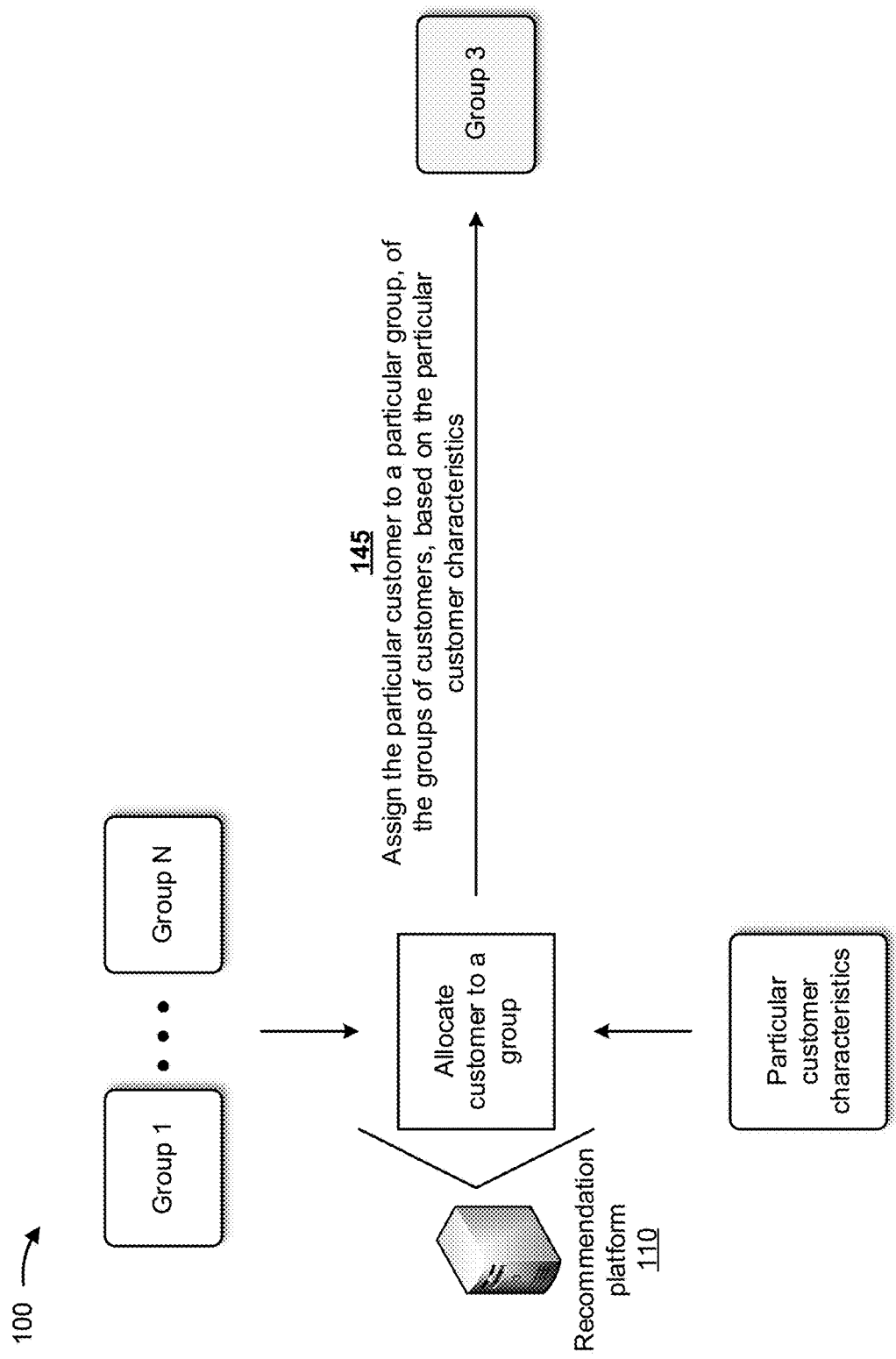

As shown in FIG. 1G, and by reference number 145, recommendation platform 110 may assign the particular customer to a particular group, of the groups of customers, based on the particular customer characteristics. In some implementations, recommendation platform 110 may determine that a similarity of the particular customer characteristics to customer characteristics associated with the particular group is greater than similarities of the particular customer characteristics to customer characteristics associated with other groups of the groups of customers, and may assign the particular customer to the particular group based on determining that the similarity of the particular customer characteristics to customer characteristics associated with the particular group is greater than the similarities of the particular customer characteristics to customer characteristics associated with the other groups.

In some implementations, recommendation platform 110 may assign the particular customer to a single group. For example, recommendation platform 110 may assign the particular customer to a single group (e.g., Group 3, as shown) of the groups of customers (e.g., Group 1 through Group N) based on a similarity of the particular customer to customers in the particular group, as determined in a manner similar to that described above in connection with FIG. 1C. Alternatively, recommendation platform 110 may assign the particular customer to two or more groups. In this case, recommendation platform 110 may allocate a weight, for the particular customer, for each of the two or more groups. For example, recommendation platform 110 may assign the particular customer to multiple groups, as determined in a manner similar to that described above in connection with FIG. 1C, and may assign weights to each of the multiple groups based on the relative similarity of the particular customer to customers in each group, in a manner similar to that described above in connection with FIG. 1C.

Figure 1H:
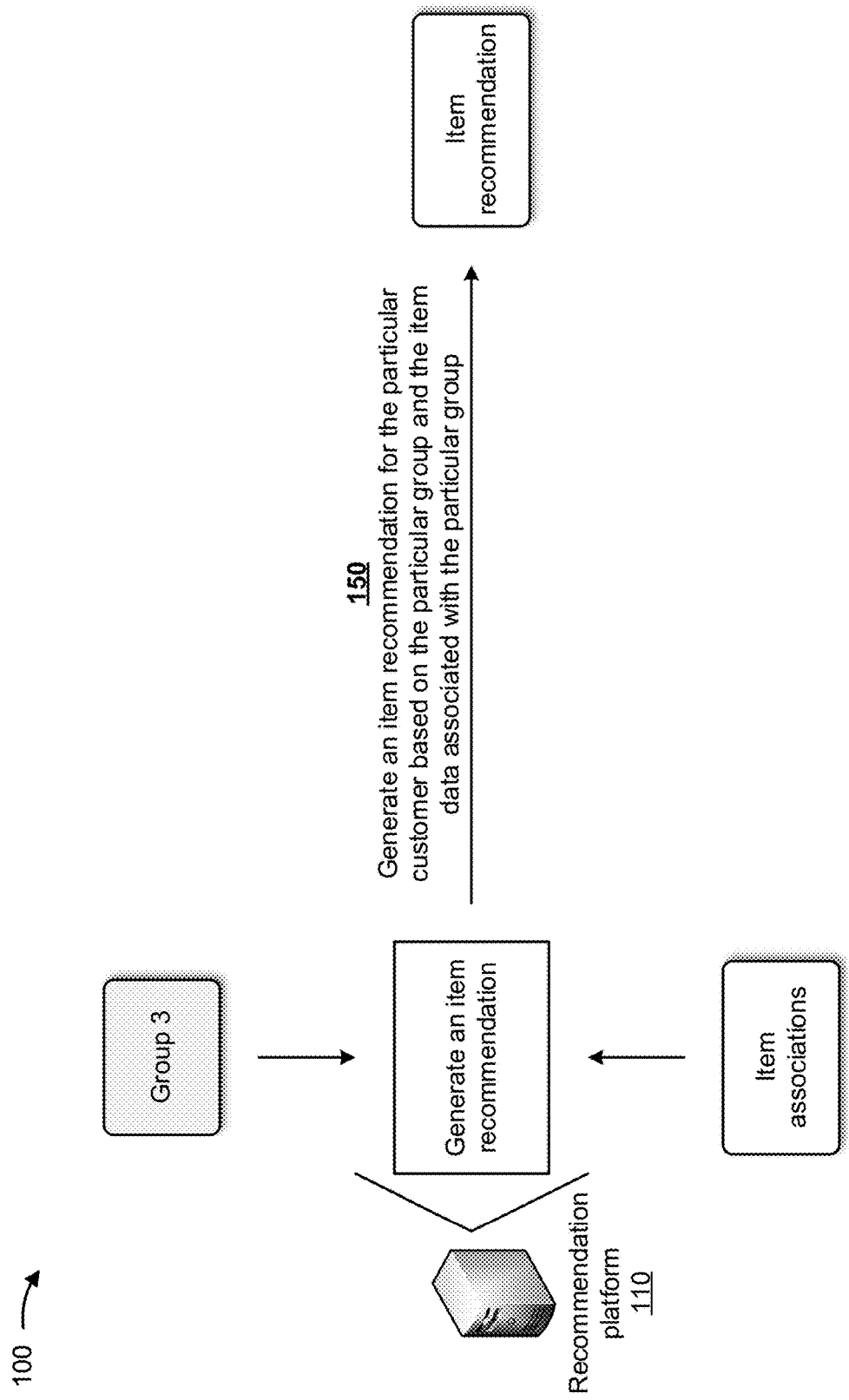

As shown in FIG. 1H, and by reference number 150, recommendation platform 110 may generate an item recommendation for the particular customer based on the particular group and the item data associated with the particular group. For example, recommendation platform 110 may generate an item recommendation based on item associations (e.g., determined above in connection with FIG. 1D) between the item data and the particular group (e.g., Group 3, as indicated above). In some implementations, recommendation platform 110 may generate the item recommendation based on information contained in the item associations, such as a conditional probability of an item within the item associations being selected based on one or more other items within the item associations.

Figure 1I:
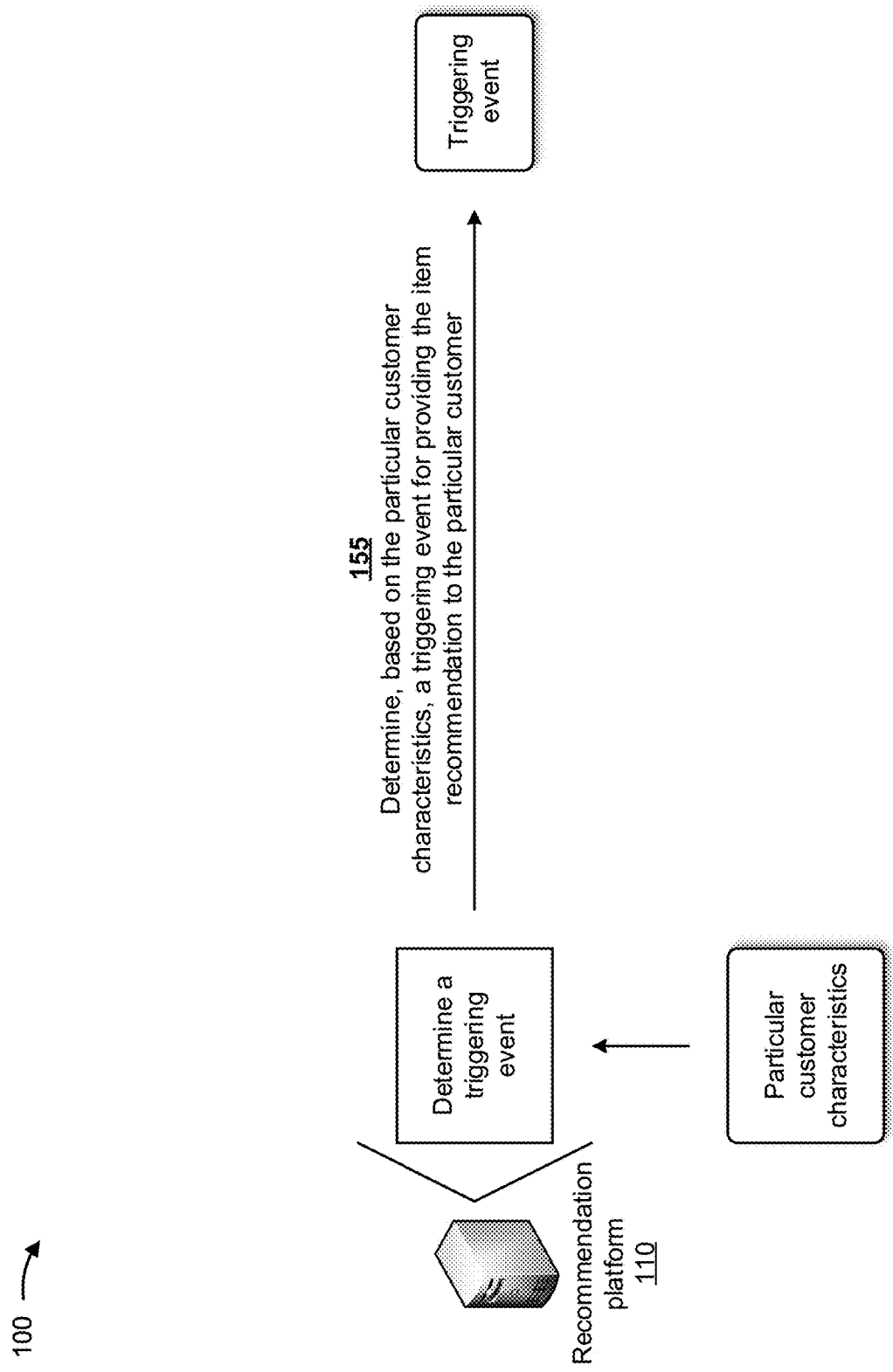

As shown in FIG. 1I, and by reference number 155, recommendation platform 110 may determine, based on the particular customer characteristics, a triggering event for providing the item recommendation to the particular customer. The triggering event may be a specific triggering event (e.g., an actual consumption of at least one item) or a generic triggering event (e.g., when the particular customer has no known prior consumption of the item subject to recommendation). In some implementations, the triggering event may be independent of customer characteristics used in constructing the particular group because none of the customer characteristics are features, characteristics, and/or properties of an item, while the triggering event is based on either no item or a specific item.

As an example of an item recommendation and a triggering event, where the recommendation relates to VOD titles, recommendation platform 110 may receive demographic and geographic data associated with a customer A, and may use the demographic and geographic data to allocate customer A to a group X (e.g., based on customer A being closest in similarity to group X when the demographic and geographic data is used). Customer A may have consumed a VOD title Y (e.g., a specific triggering event). If, in the item associations for group X, VOD titles Z1 and Z2 have the highest probabilities of occurrence given that title Y has already been consumed, recommendation platform 110 may recommend VOD titles Z1 and Z2 to customer A. Alternatively, if the triggering event is generic, recommendation platform 110 may generate one or more recommendations based on a measure of popularity or prevalence of item occurrence that is not conditioned based on the occurrence of specific VOD content. In some implementations, the measure of popularity or prevalence of content occurrence may be a frequency of title occurrence in the item associations regardless of whether other VOD titles have occurred. For example, if a customer B has a generic triggering event, customer B is allocated to a group M, and the three most frequently consumed VOD titles in the item associations for group M are Z1, Z2, and Z3, recommendation platform 110 may generate a recommendation of VOD titles Z1, Z2, and Z3 to customer B.

Figure 1J:
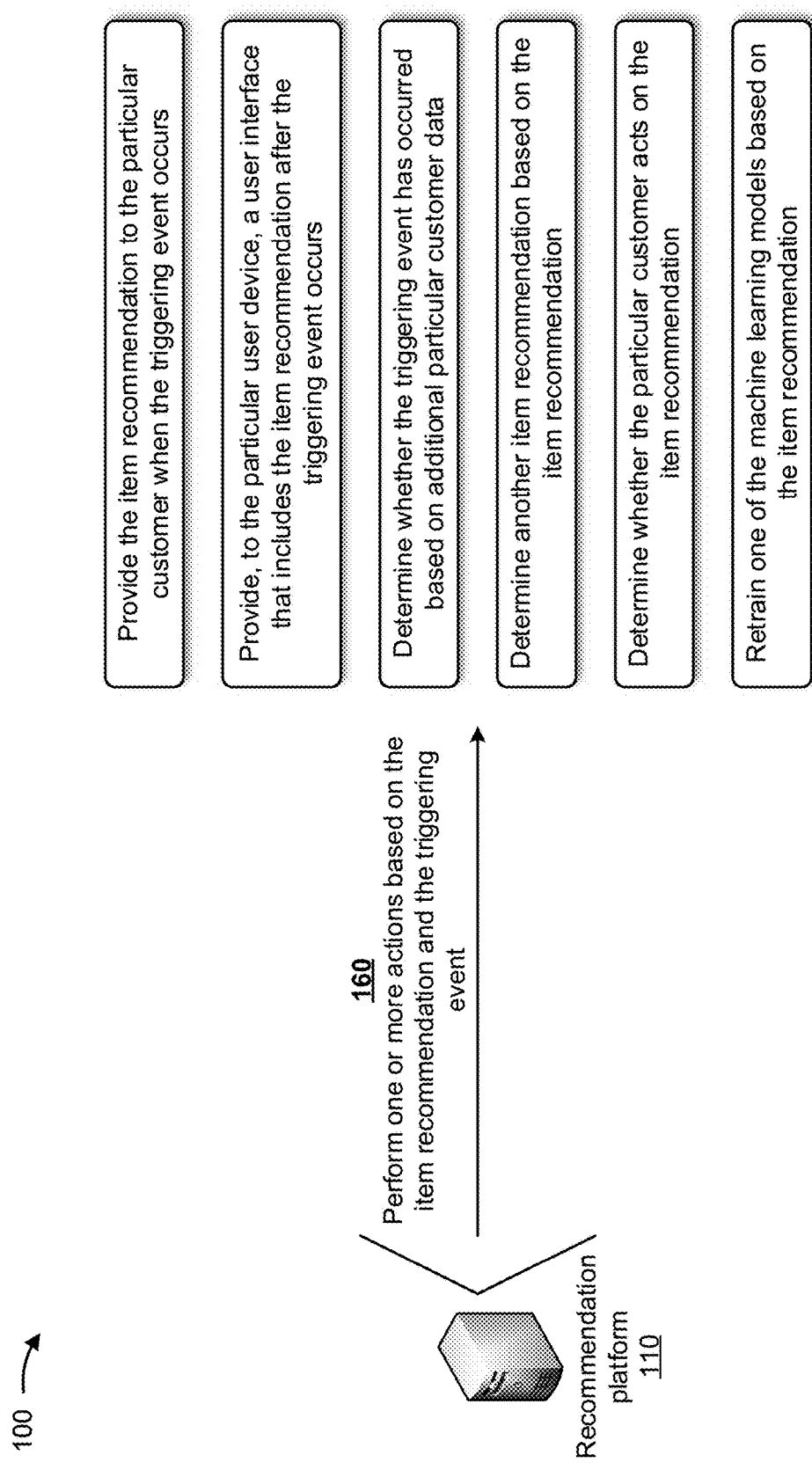

As shown in FIG. 1J, and by reference number 160, recommendation platform 110 may perform one or more actions based on the item recommendation and the triggering event. In some implementations, the one or more actions may include recommendation platform 110 providing the item recommendation to the particular customer (e.g., user device 105 of the particular customer) when the triggering event occurs. In this way, recommendation platform 110 may enable the customer to consider the recommendation and act on the recommendation (e.g., buy or rent the item, sample the item, research the item, and/or the like) based on the recommendation, which may enable a provider of the recommended item to sell or rent more items, improving efficiency and effectiveness of the provider and conserving resources (e.g., computing resources, networking resources, and/or the like) of the provider.

In some implementations, the one or more actions may include recommendation platform 110 providing, to the particular user device 105, a user interface that includes the item recommendation after the triggering event occurs. For example, recommendation platform 110 may provide a graphical user interface to be displayed by the particular user device 105, which may enable the particular customer to view the recommendation, to select or reject the item, to buy or rent the item, to sample or research the item, and/or the like. In some implementations, the user interface may be included in a system that is provided for the sale or rental of items (e.g., a VOD system). In this way, recommendation platform 110 may enable a customer to make a selection in an efficient and effective manner, thereby increasing the likelihood that the item will be consumed and conserving resources of the provider associated with marketing the item.

In some implementations, the one or more actions may include recommendation platform 110 determining whether the triggering event has occurred based on additional particular customer data. In this way, recommendation platform 110 may provide the item recommendation based on prior consumption of one or more items by the particular customer, thereby increasing a chance that the item recommendation will be of interest to the particular customer, which may enable a provider of recommended items to sell or rent more items to customers, and may conserve resources that would otherwise be wasted making item recommendations that are not taken by the particular customer.

In some implementations, the one or more actions may include recommendation platform 110 determining another item recommendation based on the item recommendation. For example, recommendation platform 110 may identify a most frequently consumed item and a second most frequently consumed item within the particular group. In this case, recommendation platform 110 may determine a first item recommendation based on the most frequently consumed item, and may provide the first item recommendation to the particular customer (e.g., user device 105 of the particular customer) associated with the particular group. If the particular customer consumes the item recommended in the first item recommendation, recommendation platform 110 may not take further action. If the particular customer does not consume the item recommended in the first item recommendation, recommendation platform 110 may determine a second item recommendation based on the second most frequently consumed item, and may provide the second item recommendation to the particular customer. In this way, recommendation platform 110 may provide a broader range of recommendations for customers while maximizing chances of items most likely to be selected by the customers, thereby enabling a provider to sell or rent more items to customers without consuming additional resources associated with the provider.

In some implementations, the one or more actions may include recommendation platform 110 determining whether the particular customer acts on the item recommendation. In this way, recommendation platform 110 may offer alternative recommendations to the particular customer when the particular customer does not act on the recommendation, may provide information identifying whether the particular customer acts on the item recommendation to the first machine learning model or the second machine learning model to improve the quality of recommendations, and/or the like.

In some implementations, the one or more actions may include recommendation platform 110 retraining one of the machine learning models based on the item recommendation. For example, recommendation platform 110 may retrain the first machine learning model to assign the customers into groups of customers based on the item recommendation, and/or may retrain the second machine learning model to determine associations between the item data and the groups of customers based on the item recommendation. In this way, recommendation platform 110 may improve the accuracy of the machine learning models in grouping the customers and/or determining the item associations, which may improve speed and efficiency of the machine learning models and conserve computing resources, network resources, and/or the like.

In this way, several different stages of the process for generating recommendations are automated with machine learning models, which may remove human subjectivity and waste from the process, and which may improve speed and efficiency of the process and conserve computing resources (e.g., processing resources, memory resources, and/or the like), communication resources, networking resources, and/or the like. Furthermore, implementations described herein use a rigorous, computerized process to perform tasks or roles that were not previously performed or were previously performed using subjective human intuition or input. For example, currently there does not exist a technique that utilizes machine learning models to generate recommendations in the manner described herein. Finally, the process for utilizing machine learning models to generate recommendations conserves computing resources, communication resources, networking resources, and/or the like that would otherwise be wasted in identifying incorrect recommendations of items, implementing the incorrect recommendations, correcting the incorrect recommendations if discovered, and/or the like.

As indicated above, FIGS. 1A-1J are provided merely as examples. Other examples may differ from what was described with regard to FIGS. 1A-1J. The number and arrangement of devices and networks shown in FIGS. 1A-1J are provided as an example. In practice, there may be additional devices and/or networks, fewer devices and/or networks, different devices and/or networks, or differently arranged devices and/or networks than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) of FIGS. 1A-1J may perform one or more functions described as being performed by another set of devices of FIGS. 1A-1J.

Figure 2:
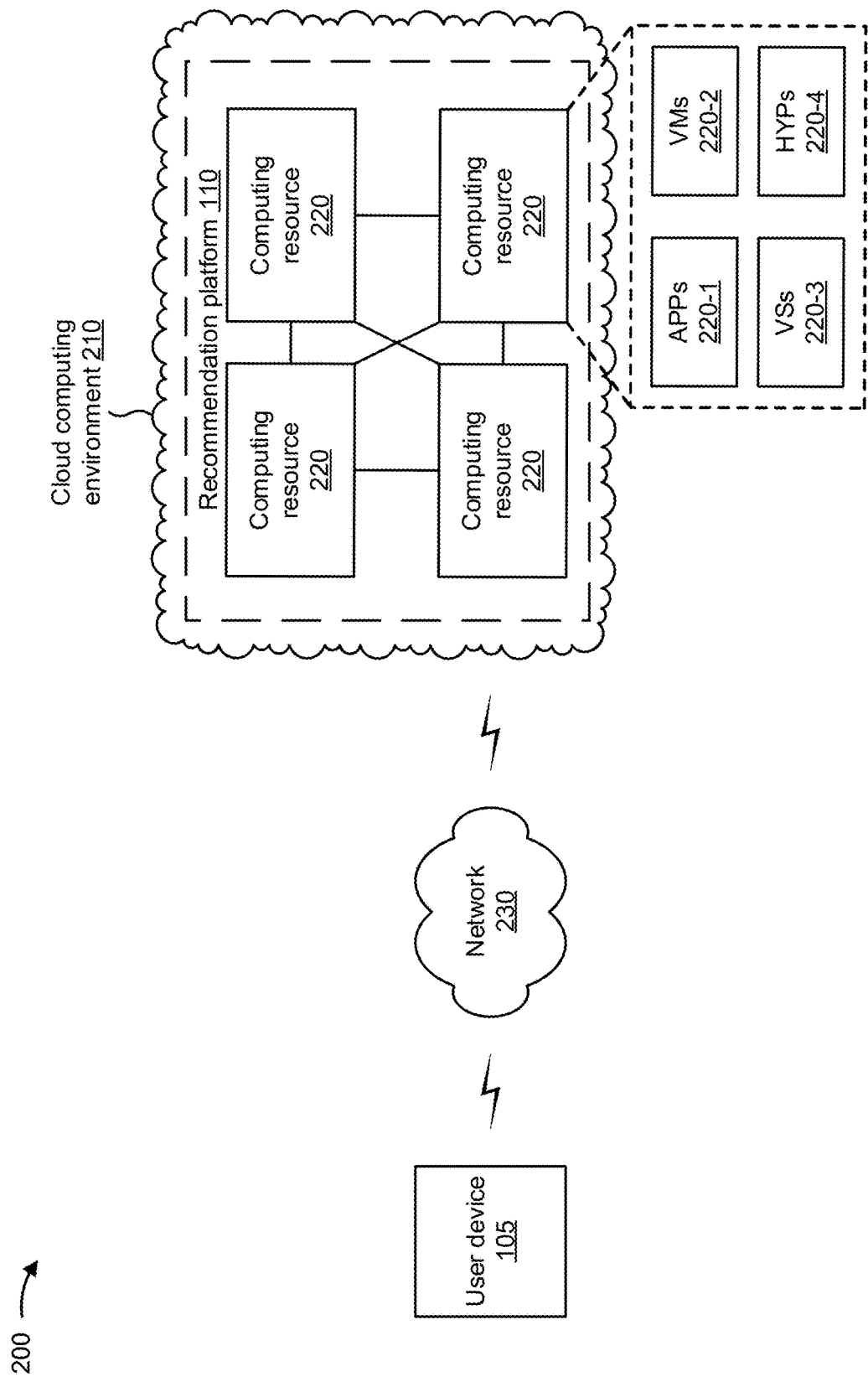
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, a recommendation platform 110, and a network 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like) or a similar type of device. In some implementations, user device 105 may receive information from and/or transmit information to recommendation platform 110.

Recommendation platform 110 includes one or more devices that utilize machine learning models to generate recommendations. In some implementations, recommendation platform 110 may be designed to be modular such that certain software components may be swapped in or out depending on a particular need. As such, recommendation platform 110 may be easily and/or quickly reconfigured for different uses. In some implementations, recommendation platform 110 may receive information from and/or transmit information to one or more user devices 105.

In some implementations, as shown, recommendation platform 110 may be hosted in a cloud computing environment 210. Notably, while implementations described herein describe recommendation platform 110 as being hosted in cloud computing environment 210, in some implementations, recommendation platform 110 may not be cloud-based (i.e., may be implemented outside of a cloud computing environment) or may be partially cloud-based.

Cloud computing environment 210 includes an environment that hosts recommendation platform 110. Cloud computing environment 210 may provide computation, software, data access, storage, etc., services that do not require end-user knowledge of a physical location and configuration of system(s) and/or device(s) that hosts recommendation platform 110. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host recommendation platform 110. The cloud resources may include compute instances executing in computing resource 220, storage devices provided in computing resource 220, data transfer devices provided by computing resource 220, and/or the like. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with recommendation platform 110 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS").

A process virtual machine may execute a single program and may support a single process. In some implementations, virtual machine 220-2 may execute on behalf of a user (e.g., a user of user device 105 or an operator of recommendation platform 110), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
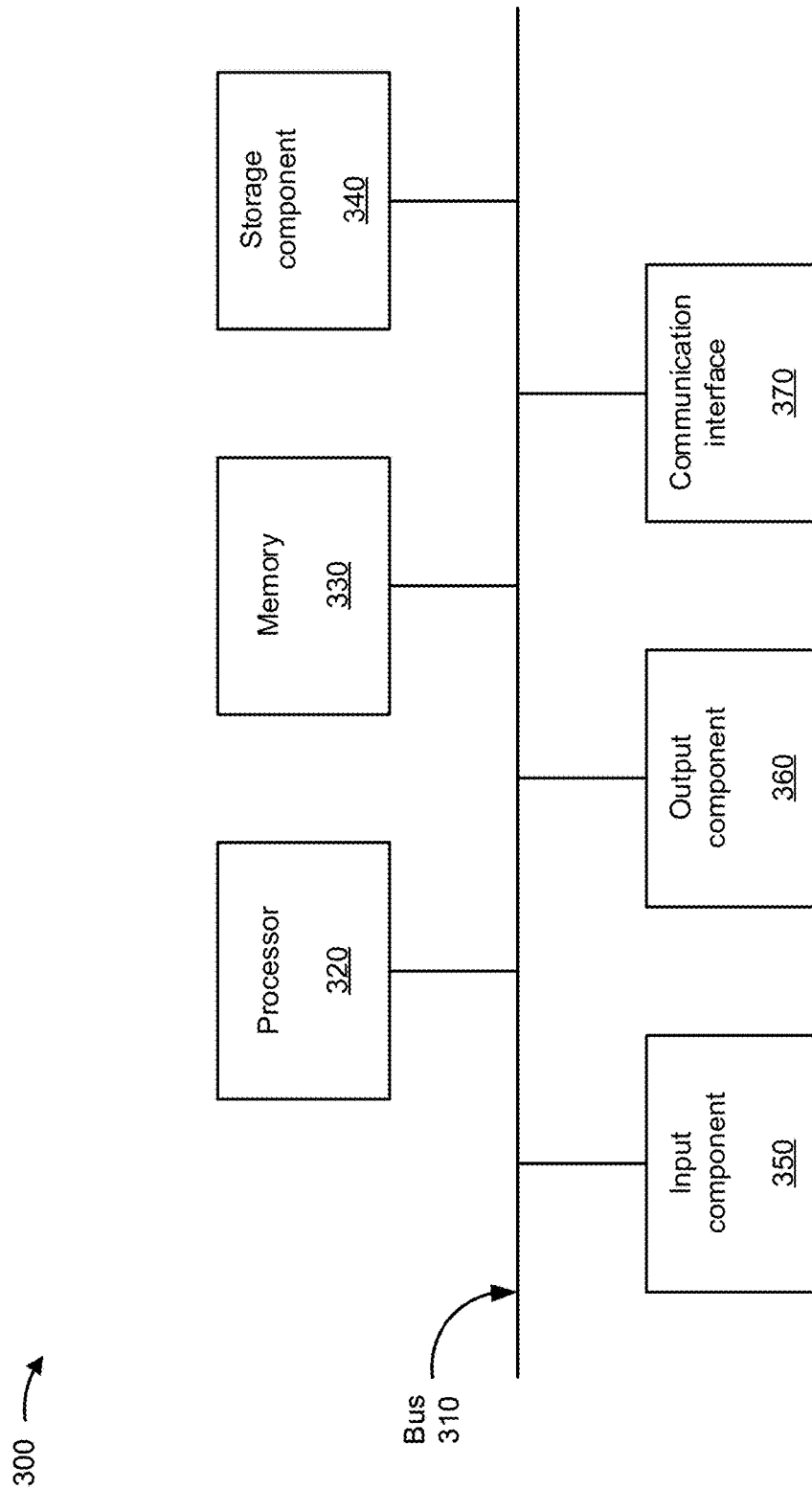
FIG. 3 is a diagram of example components of one or more devices of FIG. 2.

FIG. 3 is a diagram of example components of a device 300. Device 300 may correspond to user device 105, recommendation platform 110, and/or computing resource 220. In some implementations, user device 105, recommendation platform 110, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
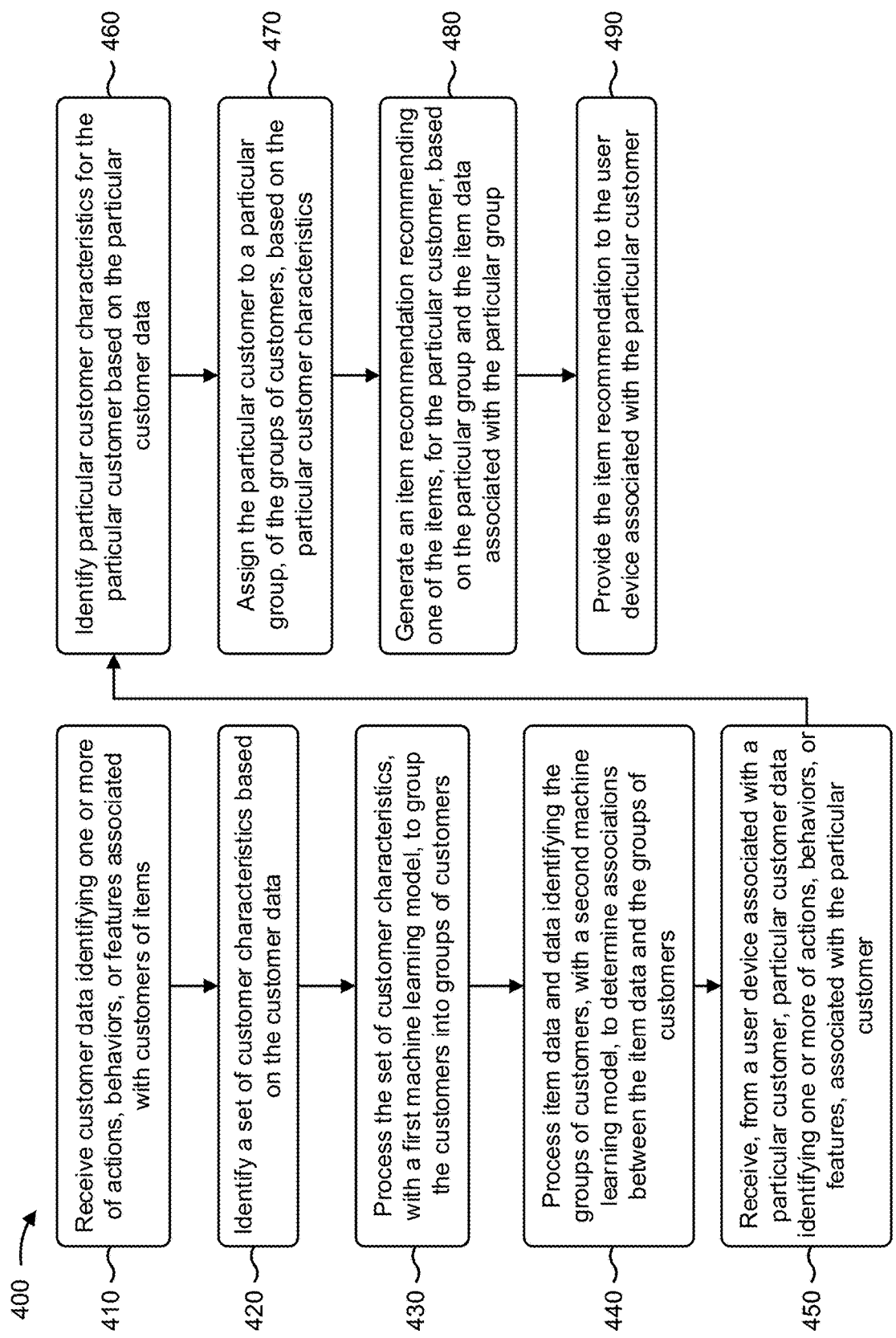
FIG. 4 is a flow chart of an example process for utilizing machine learning models to generate recommendations.

FIG. 4 is a flow chart of an example process 400 for measuring and validating key performance indicators generated by machine learning models. In some implementations, one or more process blocks of FIG. 4 may be performed by a device (e.g., recommendation platform 110). In some implementations, one or more process blocks of FIG. 4 may be performed by another device or a group of devices separate from or including the device, such as a user device (e.g., user device 105).

As shown in FIG. 4, process 400 may include receiving customer data identifying one or more of actions, behaviors, or features associated with customers of items (block 410). For example, the device (e.g., using computing resource 220, processor 320, communication interface 370, and/or the like) may receive customer data identifying one or more of actions, behaviors, or features associated with customers of items, as described above. In some implementations, receiving the customer data may include receiving the customer data over a predetermined time period.

As further shown in FIG. 4, process 400 may include identifying a set of customer characteristics based on the customer data (block 420). For example, the device (e.g., using computing resource 220, processor 320, memory 330, and/or the like) may identify a set of customer characteristics based on the customer data, as described above. In some implementations, the set of customer characteristics excludes features, characteristics, and properties of the items from which the item recommendation is generated.

As further shown in FIG. 4, process 400 may include processing the set of customer characteristics, with a first machine learning model, to group the customers into groups of customers (block 430). For example, the device (e.g., using computing resource 220, processor 320, storage component 340, and/or the like) may process the set of customer characteristics, with a first machine learning model, to group the customers into groups of customers, as described above. In some implementations, processing the set of customer characteristics, with the first machine learning model, to group the customers into the groups of customers, may include determining first characteristics associated with members of a group, of the groups of customers, and determining second characteristics associated with members of remaining groups, of the groups of customers, wherein the first characteristics differ from the second characteristics based on a quantitative criteria threshold. In some implementations, each of the customers may be grouped into one group of the groups of customers. In some implementations, each of the customers may be grouped into two or more groups of the groups of customers, and each of the customers grouped into the two or more groups, of the groups of customers, may be allocated a weight for each of the two or more groups.

As further shown in FIG. 4, process 400 may include processing item data and data identifying the groups of customers, with a second machine learning model, to determine associations between the item data and the groups of customers (block 440). For example, the device (e.g., using computing resource 220, processor 320, memory 330, and/or the like) may process item data and data identifying the groups of customers, with a second machine learning model, to determine associations between the item data and the groups of customers, as described above. In some implementations, processing the item data and the data identifying the groups of customers, with a second machine learning model, to determine the associations between the item data and the groups of customers, may include calculating consumption occurrence measures for the items based on the item data, calculating depth properties associated with the consumption occurrence measures, and determining the associations between the item data and the groups of customers based on the consumption occurrence measures and the depth properties.

As further shown in FIG. 4, process 400 may include receiving, from a user device associated with a particular customer, particular customer data identifying one or more of actions, behaviors, or features, associated with the particular customer (block 450). For example, the device (e.g., using computing resource 220, processor 320, communication interface 370, and/or the like) may receive, from a user device associated with a particular customer, particular customer data identifying one or more of actions, behaviors, or features, associated with the particular customer, as described above.

As further shown in FIG. 4, process 400 may include identifying particular customer characteristics for the particular customer based on the particular customer data (block 460). For example, the device (e.g., using computing resource 220, processor 320, memory 330, and/or the like) may identify particular customer characteristics for the particular customer based on the particular customer data, as described above.

As further shown in FIG. 4, process 400 may include assigning the particular customer to a particular group, of the groups of customers, based on the particular customer characteristics (block 470). For example, the device (e.g., using computing resource 220, processor 320, storage component 340, and/or the like) may assign the particular customer to a particular group, of the groups of customers, based on the particular customer characteristics, as described above. In some implementations, assigning the particular customer to the particular group, may include determining that a similarity of the particular customer characteristics to customer characteristics associated with the particular group is greater than similarities of the particular customer characteristics to customer characteristics associated with other groups of the groups of customers, and assigning the particular customer to the particular group based on determining that the similarity of the particular customer characteristics to customer characteristics associated with the particular group is greater than the similarities of the particular customer characteristics to customer characteristics associated with the other groups.

As further shown in FIG. 4, process 400 may include generating an item recommendation recommending one of the items, for the particular customer, based on the particular group and the item data associated with the particular group (block 480). For example, the device (e.g., using computing resource 220, processor 320, memory 330, storage component 340, and/or the like) may generate an item recommendation recommending one of the items, for the particular customer, based on the particular group and the item data associated with the particular group, as described above.

As further shown in FIG. 4, process 400 may include providing the item recommendation to the user device associated with the particular customer (block 490). For example, the device (e.g., using computing resource 220, processor 320, memory 330, storage component 340, communication interface 370, and/or the like) may provide the item recommendation to the user device associated with the particular customer, as described above.

Process 400 may include additional implementations, such as any single implementation or any combination of implementations described below and/or in connection with one or more other processes described elsewhere herein.

In some implementations, process 400 may include determining, based on the particular customer characteristics, a triggering event for providing the item recommendation to the particular customer; determining an occurrence of the triggering event; and providing the item recommendation to the user device based on determining the occurrence of the triggering event.

In some implementations, process 400 may include receiving additional particular customer data after receiving the particular customer data, and determining the occurrence of the triggering event based on receiving the additional particular customer data.

In some implementations, process 400 may include performing one or more actions based on the item recommendation.

In some implementations, performing the one or more actions may include determining another item recommendation based on the item recommendation; determining whether the particular customer acts on the item recommendation; or retraining the first machine learning model or the second machine learning model based on the item recommendation.

In some implementations, process 400 may include determining a connection between the device and the user device, and providing the item recommendation to the user device based on determining the connection between the device and the user device.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   training, by a device, at least one of:
      a first machine learning model, using historical customer data associated with previous customers of previous items, to group previous customers into groups of previous customers, or
      a second machine learning model, using previous consumption occurrence measures and previous depth properties associated with the previous consumption occurrence measures, to determine previous associations between previous item data and the groups of previous customers;
   receiving, by the device, customer data identifying one or more of actions, behaviors, or features associated with customers of items;
   identifying, by the device, a set of customer characteristics based on the customer data;
   grouping, by the device and based on processing the set of customer characteristics with the first machine learning model, the customers into groups of customers;
   calculating, by the device, consumption occurrence measures for the items based on item data, wherein the consumption occurrence measures include a first probability of a first item being consumed when a second item has been consumed;
   calculating, by the device, depth properties associated with the consumption occurrence measures, wherein the depth properties include a second probability of the first item being consumed when a plurality of items, including the second item, have been consumed in a time series;
   determining, by the device and using the second machine learning model, associations, between the item data and the groups of customers, based on the consumption occurrence measures and the depth properties;
   receiving, by the device and from a user device associated with a particular customer, particular customer data identifying one or more of actions, behaviors, or features, associated with the particular customer, wherein the user device is different from the device;
   identifying, by the device, particular customer characteristics for the particular customer based on the particular customer data;
   assigning, by the device, the particular customer to a particular group, of the groups of customers, based on the particular customer characteristics;
   generating, by the device, an item recommendation, recommending one of the items and for the particular customer, based on an association, between the particular group and the item data, of the determined associations;
   providing, by the device, the item recommendation to the user device associated with the particular customer; and
   retraining, by the device and based on the item recommendation, at least one of the first machine learning model or the second machine learning model,
      wherein at least one of:
         the first machine learning model is retrained to identify a pattern of the particular customer characteristics based on the item recommendation, or
         the second machine learning model is retrained to determine a pattern of the determined associations, between the item data and the groups of customers, based on the item recommendation.

2. The method of claim 1, further comprising:
   determining, based on the particular customer characteristics, a triggering event for providing the item recommendation to the particular customer; and
   determining an occurrence of the triggering event,
      wherein providing the item recommendation to the user device comprises:
         providing the item recommendation to the user device based on determining the occurrence of the triggering event.

3. The method of claim 2, further comprising:
   receiving additional particular customer data after receiving the particular customer data, wherein determining the occurrence of the triggering event comprises:
      determining the occurrence of the triggering event based on receiving the additional particular customer data.

4. The method of claim 1, further comprising:
   performing one or more actions based on the item recommendation.

5. The method of claim 4, wherein performing the one or more actions comprises one or more of:
   determining another item recommendation based on the item recommendation; or
   determining whether the particular customer acts on the item recommendation.

6. The method of claim 1, wherein receiving the customer data comprises:

receiving the customer data over a predetermined time period.

7. The method of claim 1, wherein the set of customer characteristics excludes features, characteristics, and properties of the items from which the item recommendation is generated.

8. A device, comprising:
one or more memories; and
one or more processors, coupled to the one or more memories, configured to:
  train at least one of:
    a first machine learning model, using historical customer data associated with previous customers of previous items, to group previous customers into groups of previous customers, or
    a second machine learning model, using previous consumption occurrence measures and previous depth properties associated with the previous consumption occurrence measures, to determine previous associations between previous item data and the groups of previous customers;
  receive customer data identifying one or more of actions, behaviors, or features associated with customers of items;
  identify a set of customer characteristics based on the customer data;
  group, based on processing the set of customer characteristics with the first machine learning model, the customers into groups of customers;
  calculate consumption occurrence measures for the items based on item data, wherein the consumption occurrence measures include a first probability of a first item being consumed when a second item has been consumed;
  calculate depth properties associated with the consumption occurrence measures, wherein the depth properties include a second probability of the first item being consumed when a plurality of items, including the second item, have been consumed in a time series;
  determine, using the second machine learning model, associations, between the item data and the groups of customers, based on the consumption occurrence measures and the depth properties;
  receive, from a user device associated with a particular customer, particular customer data identifying one or more of actions, behaviors, or features, associated with the particular customer;
  identify particular customer characteristics for the particular customer based on the particular customer data;
  assign the particular customer to a particular group, of the groups of customers, based on the particular customer characteristics;
  generate an item recommendation, recommending one of the items and for the particular customer, based on an association, between the particular group and the item data, of the determined associations; and
  retrain, based on the item recommendation, at least one of the first machine learning model or the second machine learning model,
    wherein at least one of:
      the first machine learning model is retrained to identify a pattern of the particular customer characteristics based on the item recommendation, or
      the second machine learning model is retrained to determine a pattern of the determined associations, between the item data and the groups of customers, based on the item recommendation.

9. The device of claim 8, wherein the one or more processors, to process the set of customer characteristics with the first machine learning model, are configured to:
  determine first characteristics associated with members of a group, of the groups of customers; and
  determine second characteristics associated with members of remaining groups, of the groups of customers;
    wherein the first characteristics differ from the second characteristics based on a quantitative criteria threshold.

10. The device of claim 8, wherein each of the customers is grouped into one group of the groups of customers.

11. The device of claim 8, wherein each of the customers is grouped into two or more groups of the groups of customers and is allocated a weight for each of the two or more groups.

12. The device of claim 8, wherein the one or more processors, to assign the particular customer to the particular group, are configured to:
  determine that a similarity of the particular customer characteristics to customer characteristics associated with the particular group is greater than similarities of the particular customer characteristics to customer characteristics associated with other groups of the groups of customers; and
  assign the particular customer to the particular group based on determining that the similarity of the particular customer characteristics to customer characteristics associated with the particular group is greater than the similarities of the particular customer characteristics to customer characteristics associated with the other groups.

13. The device of claim 8, wherein the one or more processors are further configured to:
  determine a connection between the device and the user device; and
  provide the item recommendation to the user device based on determining the connection between the device and the user device.

14. A non-transitory computer-readable medium storing instructions, the instructions comprising:
  one or more instructions that, when executed by one or more processors, cause the one or more processors to:
    train at least one of:
      a first machine learning model, using historical customer data associated with previous customers of previous items, to group previous customers into groups of previous customers, or
      a second machine learning model, using previous consumption occurrence measures and previous depth properties associated with the previous consumption occurrence measures, to determine previous associations between previous item data and the groups of previous customers;
    receive customer data identifying one or more of actions, behaviors, or features associated with customers of items;
    identify a set of customer characteristics based on the customer data;
    group, based on processing the set of customer characteristics with a first machine learning model, the customers into groups of customers;

calculate consumption occurrence measures for the items based on item data, wherein the consumption occurrence measures include a first probability of a first item being consumed when a second item has been consumed;

calculate depth properties associated with the consumption occurrence measures, wherein the depth properties include a second probability of the first item being consumed when a plurality of items, including the second item, have been consumed in a time series;

determine, based on using a second machine learning model, associations, between the item data and the groups of customers, based on the consumption occurrence measures and the depth properties;

receive, from a user device associated with a particular customer, particular customer data identifying one or more of actions, behaviors, or features, associated with the particular customer;

identify particular customer characteristics for the particular customer based on the particular customer data;

assign the particular customer to a particular group, of the groups of customers, based on the particular customer characteristics;

generate an item recommendation,. recommending one of the items and for the particular customer, based on an association, between the particular group and the item data, of the determined associations;

determine, based on the particular customer characteristics, a triggering event for providing the item recommendation to the particular customer;

determine an occurrence of the triggering event;

provide the item recommendation to the user device associated with the particular customer based on determining the occurrence of the triggering event; and retrain, based on the item recommendation, at least one of the first machine learning model or the second machine learning model,
  wherein at least one of:
    the first machine learning model is retrained to identify a pattern of the particular customer characteristics based on the item recommendation, or
    the second machine learning model is retrained to determine a pattern of the determined associations, between the item data and the groups of customers, based on the item recommendation.

15. The non-transitory computer-readable medium of claim 14, wherein the instructions further comprise:
  one or more instructions that, when executed by the one or more processors, cause the one or more processors to one or more of:
    determine another item recommendation based on the item recommendation; or
    determine whether the particular customer acts on the item recommendation.

16. The non-transitory computer-readable medium of claim 14, wherein the set of customer characteristics excludes features, characteristics, and properties of the items from which the item recommendation is generated.

17. The non-transitory computer-readable medium of claim 14, wherein the one or more instructions, that cause the one or more processors to process the set of customer characteristics, with the first machine learning model, to group the customers into the groups of customers, cause the one or more processors to:
  determine first characteristics associated with members of a group, of the groups of customers; and
  determine second characteristics associated with members of remaining groups, of the groups of customers;
  wherein the first characteristics differ from the second characteristics based on a quantitative criteria threshold.

18. The non-transitory computer-readable medium of claim 14, wherein each of the customers is grouped into one group of the groups of customers.

19. The non-transitory computer-readable medium of claim 14, wherein each of the customers is grouped two or more groups of the groups of customers, and
  wherein each of the customers grouped into the two or more groups, of the groups of customers, is allocated a weight for each of the two or more groups.

20. The non-transitory computer-readable medium of claim 14, wherein the instructions further comprise:
  one or more instructions that, when executed by the one or more processors, cause the one or more processors to one or more of:
    determine a connection between the device and the user device; and
    provide the item recommendation to the user device based on determining the connection between the device and the user device.

* * * * *